US012694741B2

(12) United States Patent
Mattison et al.

(10) Patent No.: US 12,694,741 B2
(45) Date of Patent: Jul. 28, 2026

(54) COUNTERFEIT NOTE DETECTION VIA MACHINE OLFACTION CHEMICAL ANALYSIS

(71) Applicant: Bank of America Corporation, Charlotte, NC (US)

(72) Inventors: Paul Mattison, Sherrills Ford, NC (US); Richard Brown, Charlotte, NC (US); Ronald Schnittman, Northbrook, IL (US); Carl Parziale, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/378,462

(22) Filed: Oct. 10, 2023

(65) Prior Publication Data

US 2025/0118129 A1 Apr. 10, 2025

(51) Int. Cl.
*G07D 7/14* (2006.01)
*G07F 19/00* (2006.01)

(52) U.S. Cl.
CPC ............. *G07D 7/14* (2013.01); *G07F 19/209* (2013.01); *G07F 19/211* (2013.01)

(58) Field of Classification Search
CPC .......... G07D 7/00; G07D 7/14; G07F 19/209; G07F 19/211; G07F 19/00
USPC .......... 704/43; 283/67, 70, 72, 74, 117, 901, 283/95, 96
See application file for complete search history.

(56) References Cited

U.S. PATENT DOCUMENTS

| | | | | |
|---|---|---|---|---|
| 5,799,102 | A * | 8/1998 | Leong | G07D 7/00 382/135 |
| 9,004,004 | B2 | 4/2015 | Nielsen et al. | |
| 9,984,538 | B2 | 5/2018 | Crist et al. | |
| 10,672,203 | B2 | 6/2020 | Dai et al. | |
| 2003/0046234 | A1 * | 3/2003 | Takadachi | G06Q 20/381 705/43 |
| 2005/0143249 | A1 | 6/2005 | Ross et al. | |
| 2008/0126106 | A1 * | 5/2008 | He | G06Q 20/1085 235/379 |

(Continued)

FOREIGN PATENT DOCUMENTS

| | | | |
|---|---|---|---|
| EP | 0789239 | A1 | 8/1997 |
| EP | 0708947 | B1 | 10/1997 |
| KR | 102253148 | B1 | 5/2021 |

OTHER PUBLICATIONS

What Gives Money Its Distinctive Smell? One Chemist Tried to Find Out—WSJ.

(Continued)

*Primary Examiner* — Justin V Lewis
(74) *Attorney, Agent, or Firm* — Banner & Witcoff, Ltd.

(57) ABSTRACT

A method and system for detecting counterfeit money may include an automated teller machine (ATM) including an olfactory sensor configured to detect counterfeit notes and valid notes, an olfactory signature database comprising counterfeit note olfactory signatures and valid note olfactory signatures, wherein the ATM may be in communication with the olfactory signature database, and wherein the olfactory sensor via the ATM detects and transmits olfactory note signatures to the olfactory signature database, and wherein the ATM is configured to reject a detected counterfeit note for deposit.

13 Claims, 3 Drawing Sheets

(56) References Cited

U.S. PATENT DOCUMENTS

| | | | | |
|---|---|---|---|---|
| 2015/0146963 | A1* | 5/2015 | Klein ....................... | G07D 7/00<br>382/135 |
| 2018/0120277 | A1 | 5/2018 | Chang et al. | |
| 2021/0123601 | A1 | 4/2021 | Martin et al. | |

OTHER PUBLICATIONS

Smell of dollars' could catch smugglers—BBC News, Aug. 2014, pp. 1-11.
Mark Purdy, et al., Business Scents: The Rise of Digital Olfaction. MITSloan Management Review, May 2021, pp. 1-4.

* cited by examiner

COUNTERFEIT NOTE DETECTION VIA MACHINE OLFACTION CHEMICAL ANALYSIS

TECHNICAL FIELD

The present disclosure relates to systems, apparatus, methods, and processes that enable a user to complete a valid and secure financial transaction resulting in valid monetary notes being transferred into an account and the rejection of counterfeit monetary notes, the transaction involving digital telecommunication between electronic devices and completed without the direct intervention of another human. In particular, systems, apparatus, methods, and processes using automated teller machines (ATM) to identify counterfeit money using machine olfaction.

DESCRIPTION OF THE RELATED ART

The use of automated teller machines is linked to a variety of different threat vectors and security issues. Use of ATMs for the deposit of counterfeit monetary notes is but one example of bank fraud.

Detecting counterfeit notes is becoming more challenging as printing technology continues to improve. Counterfeit notes look and feel very similar to real notes and manufacturers work with the United States Secret Service to design note templates based upon real and valid notes so that when a counterfeit note is introduced into the ATM note reader, differences can be detected and the counterfeit note can either be rejected or captured. A more recent increase, however, in counterfeit notes making past conventional and current defenses has increased the need for improved technology that is harder to replicate and has increased capabilities for the detection of counterfeit notes.

The foregoing has presented constant problems and there is a long felt need in the industry to address these problems to provide a substantially increased level of security for both banks and the authorities to detect counterfeit notes deposited in the ATMs.

SUMMARY OF THE INVENTION

In accordance with one or more arrangements of the non-limiting sample disclosures contained herein, solutions are disclosed to address one or more of the shortcomings in the field of information security in order to provide improved, real-time, monitoring, control, fraud prevention, and enhanced security for ATMs in general by identifying counterfeit notes for ATM deposit using an ATM that may include a display screen, a note reader, and an olfactory sensor coupled to the note reader, wherein the olfactory sensor is configured to detect counterfeit notes. In some examples, the olfactory sensor may be further configured to detect valid notes. In another example, the olfactory sensor may be configured to detect and categorize a chemical olfactory signature of a counterfeit note. In some examples, the chemical olfactory signature may comprise a unique odor identifiable to the counterfeit note or a valid note. In one example, the note reader may reject a detected counterfeit note. In certain examples, the note reader may accept a detected valid note. In some examples, the ATM may be in communication with an olfactory signature database comprising United States Secret Service approved chemical olfactory signatures of valid notes. In other examples, the olfactory sensor may be configured to transmit the detected chemical olfactory signature to the olfactory signature database. In some examples, the detected chemical olfactory signature may be stored as a counterfeit chemical olfactory signature and/or stored as a valid chemical olfactory signature in the olfactory signature database.

In accordance with another arrangement as disclosed herein, a system for detecting counterfeit money include an ATM having an olfactory sensor that may be configured to detect counterfeit notes and/or valid notes for deposit, and an olfactory signature database that may include counterfeit note olfactory signatures and/or valid note olfactory signatures, wherein the ATM may be in communication with the olfactory signature database, and wherein the olfactory sensor via the ATM detects and transmits olfactory note signatures to the olfactory signature database. In some examples, the olfactory signature database may include United States Secret Service approved olfactory signatures of valid notes, and/or olfactory signatures of counterfeit notes. In yet other examples, the ATM may be configured to reject a detected counterfeit note for deposit. In other examples, the ATM may be further configured to remove a detected counterfeit note from circulation and may be configured to transmit a warning to the appropriate authorities.

In accordance with still another embodiment as disclosed herein, a method of detecting counterfeit money may include the steps of accepting via an ATM a note for deposit wherein the ATM may include an olfactory sensor configured to detect counterfeit notes, detecting via the olfactory sensor a counterfeit note, and transmitting a warning to the appropriate authorities or bank management. In some examples, the olfactory sensor may be further configured to detect valid notes. In certain examples, the method of detecting counterfeit money may include the additional step of transmitting a detected olfactory signature to an olfactory signature database, wherein the olfactory signature database may include United States Secret Service approved olfactory signatures of valid notes and olfactory signatures of counterfeit notes. In another example, the method of detecting counterfeit money may include the additional step of cross-checking a detected olfactory signature with the olfactory signature database to identify a valid note having a United States Secret Service approved olfactory signature, and accepting for deposit the valid note having a United States Secret Service approved olfactory signature. In still another example, the method of detecting counterfeit money may include the additional step of rejecting for deposit a counterfeit note having a non-United States Secret Service approved olfactory signature.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the processes of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

The present disclosure is illustrated by way of example and not limited in the accompanying figures in which like reference numerals indicate similar elements and in which.

DETAILED DESCRIPTION

Figure 1:
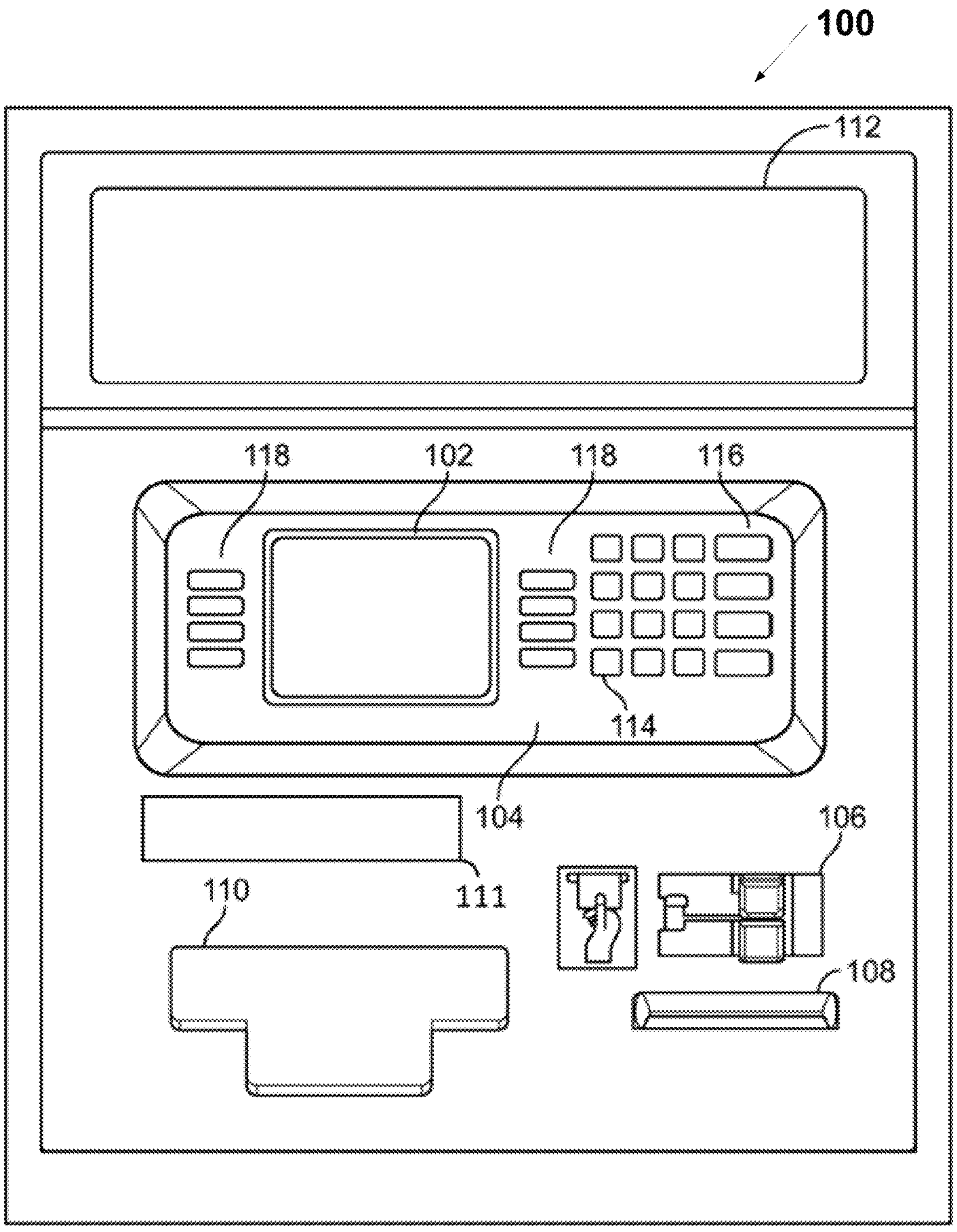
FIG. 1 depicts an external view and external components of an exemplary ATM.

When a counterfeiter creates a fake note, there are limitations on the materials that they can acquire and use to generate the fake note, otherwise, the counterfeit would be easily detectable. Counterfeit notes can be identified visually and by other means. For example, limitations may include paper types and ink types, both of which may contain a specific formulation of chemicals and metals to form the note materials. Interestingly, when a note is created, due to is specific chemical makeup, it has a very specific odor. The use of machine olfaction devices and sensors that can detect and capture specific odors may be used in the counterfeit note detection process to identify notes that do not contain the specific odor composition that is present in valid notes. The systems, processes, apparatus, and methods discussed herein may utilize olfaction devices and sensors for the detection of counterfeit notes and/or the detection of valid notes. ATMs may be constructed or retrofitted with the hardware and software to read and analyze notes through machine olfaction to identify and reject counterfeit notes submitted for deposit in an ATM.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, methods, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in networkattached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "network (s)," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting example, FIG. 1 depicts a view of the external/internal components of an exemplary ATM that is internally modified in accordance with the disclosures contained herein. FIG. 1 shows examples of externally visible components taken from a conventional ATM. One such illustration can be found in U.S. Pat. No. 9,984,538, which is hereby incorporated herein by reference in its entirety for all purposes. Monitor 102, keypad 104, card reader port 106, acceptor 108, item dispenser 110, and security screen 112 are all possible components of an automated teller machine. It is possible for monitor 102 to communicate with a user using either visual or audio information. The user may be able to enter numerical and textual information using the keypad 104, which may include alphanumeric keys 114. Control keys 116 could be included on the keypad 104. The control information, such as instructions, that you need to communicate to the self-service device can be sent via the control keys 116. It is possible that the keypad 104 has some soft keys 118. The user is informed of the functions that soft keys 118 may have by using information that may be displayed on monitor 102. These functions may be predetermined by the programming of the system. As disclosed herein, ATM 100 may include an externally affixed or internally positioned olfactory device or sensor 111.

The front end of any card reader that is suitable can be plugged into card reader port 106. The card reader has the capability of reading information that is magnetically encoded on transaction instruments such as bank cards. A contactless chip reader, a wireless transceiver, or any other interface that is deemed suitable for exchanging transaction information with a transaction instrument may be included in the automated teller machine. A chip, an RFID tag, a smart card, a tablet, a smartphone, or any other device that is suitable may serve as the transaction instrument.

The automated teller machine might have a biometric sensor (not shown). A user could be recognized by the biometric sensor based on a distinguishing trait, such as an anatomical feature, that is unique to that user. For instance, the biometric sensor may be programmed to identify the user based on all or part of a face, a fingerprint, an iris, a retina, a hand, or any other suitable anatomical feature. Similarly, the sensor may be programmed to identify the user based on any other suitable anatomical feature. A behavioral feature, such as a signature, a voice, a gait, or any other suitable behavioral characteristic, may be used by the biometric sensor to identify the user. Other behavioral characteristics may also be used.

Acceptor 108 is able to take almost any suitable physical object. For instance, acceptor 108 is able to take in notes, envelops, deposit slips, bills, and checks, in addition to any other appropriate documents. It is possible that acceptor 108 feeds documents into a scanner, which then digitizes them for image-based transaction processing. Item dispenser 110 may dispense items. For instance, item dispenser 110 may dispense various forms of currency. Notes that have not been collected by a user of device 100 can be retracted by item dispenser 110. The visual input from a surveillance device may be screened by security screen 112 (not shown). It is possible for the surveillance device to provide video information about people who are present close to the self-service device as well as the conditions that are present there. It is possible for the surveillance device to pick up on the fact that there is motion in the area around device 100.

Acceptor 108 may be engaged with or otherwise connected to olfactory device or sensor 111. ATM 100 may also include a dispenser (not shown) configured to engage acceptor 108 and/or olfactory device or sensor 111. The dispenser may be configured to apply a chemical or other material to a note prior to analysis by olfactory device or sensor 111. Application of a chemical or other material to a note may be required prior to machine olfaction by olfactory device or sensor 111.

Machine olfaction is known as a technique to simulate the sense of smell. As described above, olfactory device or sensor 111 may be configured to detect and analyze odors. Specifically, odors produced by unique olfactory or chemical signatures of monetary notes. Unique odors used to categorize and recognize monetary notes may be associated with the materials used to compose the monetary notes such as the type of paper, inks, metal components, etc.

Example olfactory sensors are described in U.S. Pat. No. 9,004,004, which is hereby incorporated herein by reference in its entirety for all purposes. Olfactory sensor 111 may generate digital and/or analog signals. The output signal of olfactory sensor 111 may be utilized directly by a system machine or processor to determine an olfactory signature of a counterfeit note and/or a valid note.

Machine olfaction associated with olfactory device or sensor 111 may also include a pattern analysis and recognition capability to assist in the analysis and detection of counterfeit notes and the recording/saving of olfactory or chemical signatures associated with counterfeit notes and/or United States Secret Service provided olfactory or chemical signatures associated with valid notes. Pattern analysis may include factors such as olfactory or chemical signatures, geographic location of ATM, geographic origination of a counterfeit note or associated serial number, etc. In some examples, the pattern analysis may include collected visual input from a surveillance device screened by security screen 112 to include facial recognition, or other video information about people who are present at ATM 100 when counterfeit notes are uploaded, detected, and/or captured.

Olfactory device or sensor 111 may include an array of sensors and may typically employ detection techniques such as conductive-polymer odor sensors, tin-oxide gas sensors, and quartz-crystal micro-balance sensors. In some examples, olfactory device or sensor 111 may be initialized or trained using known olfactory signatures of valid and/or olfactory signatures of known counterfeit notes. Olfactory device or sensor 111 may then be configured to detect counterfeit notes and/or detect valid notes uploaded to acceptor 108 for deposit.

Figure 2:
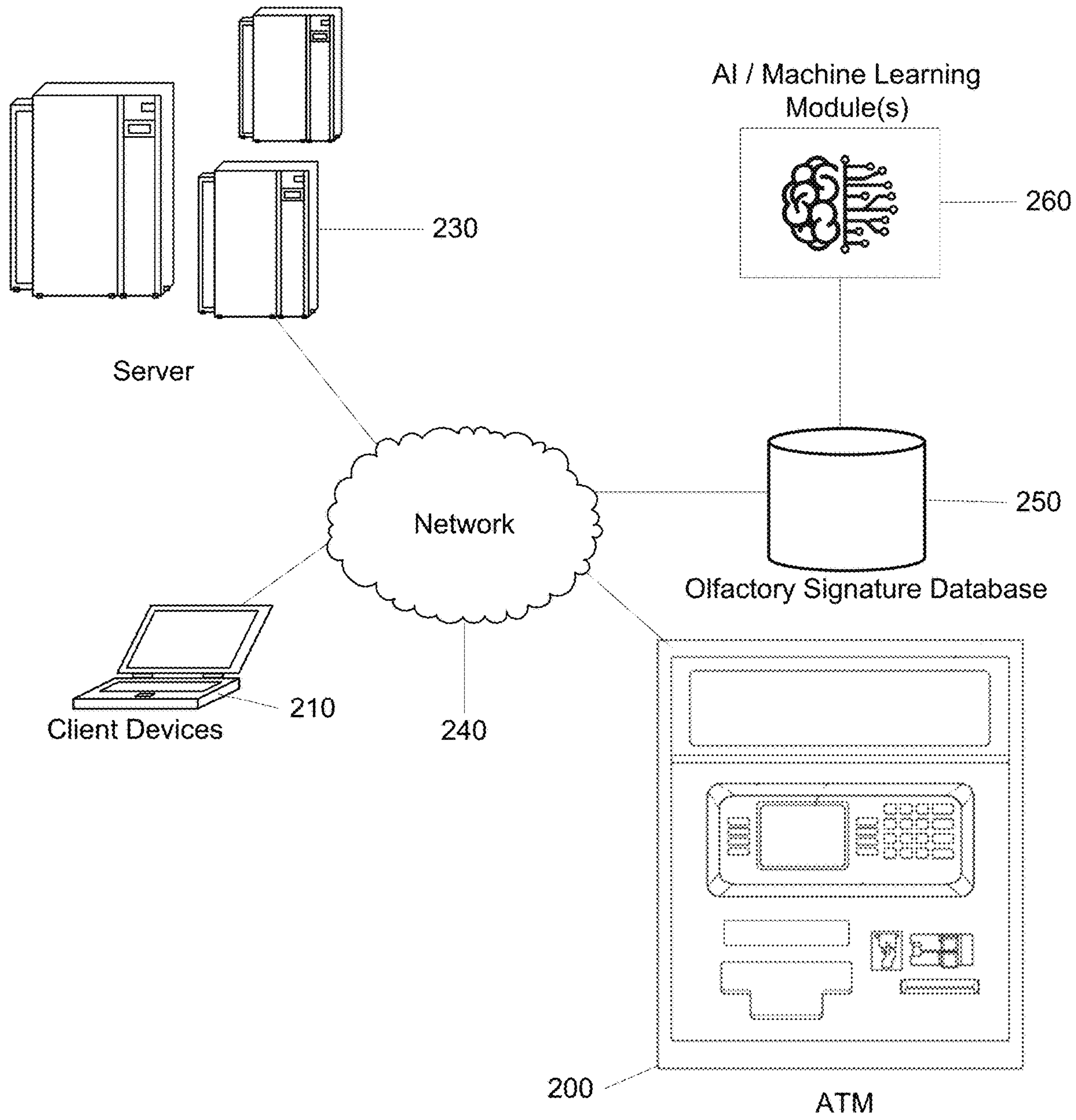
FIG. 2 depicts a system and operating environment for detecting counterfeit notes in accordance with one or more aspects of this disclosure.

By way of non-limiting example, FIG. 2 depicts a system and operating environment for detecting counterfeit notes in accordance with one or more aspects of this disclosure. Operating environment for detecting counterfeit notes may include at least one or a plurality of ATM(s) 200, at least one or a plurality of client device(s) or computer machine(s) 210, an olfactory signature database 250, a server system 230, all in communication via network 240. Client device or machine 210 may be used to communicate warnings or indications of counterfeit note detection to authorities, such as the United States Secret Service, or to a bank or other financial institution. Server 230 may receive user input or requests via ATM 200 and/or client devices 210 as described herein. Network 240 may include a local area network (LAN), a wide area network (WAN), a wireless telecommunications network, and/or any other communication network or combinations thereof and as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computer machines, ATMs, devices, servers, etc., described herein may be configured to communicate using any of these network protocols or technologies.

The system and operating environment for detecting counterfeit notes of FIG. 2 may also include olfactory signature database 250. Olfactory signature database 250 may include known olfactory signatures used to compare detected olfactory signatures against United States Secret Service validated note chemical signatures. Detected and analyzed signatures indicating a known counterfeit note may also be stored in olfactory signature database 250. Olfactory signature database may be updated periodically with emerging olfactory data or data from US Secret Service provided templates.

Artificial Intelligence (AI)/Machine learning module(s) 260 may be used to train the systems, apparatus, processes, and methods disclosed herein to operate autonomously to analyze collected note olfactory signatures to create a composite of known olfactory signatures and variations that may be used in the note chemical or olfactory signature analysis. Machine learning techniques may also be used within and in conjunction with the system and operating environment of FIG. 2, to include olfactory signature database 250, to analyze note olfactory signatures to create a composite of known signatures and variations of note olfactory signatures that can be used in the analysis of notes uploaded to ATM 200. Artificial intelligence technologies and techniques may be layered on top of the machine learning analysis of detected and/or known olfactory signatures of both validated and counterfeit note samples to make recommended changes to the rejection or acceptance parameters of the uploaded notes. In some examples, olfactory signature database 250 may further include a catalog of and storage of chemical compositions and/or olfactory signatures that identify the composition(s) of counterfeit notes that have been produced over the years, and/or validated notes.

Figure 3:
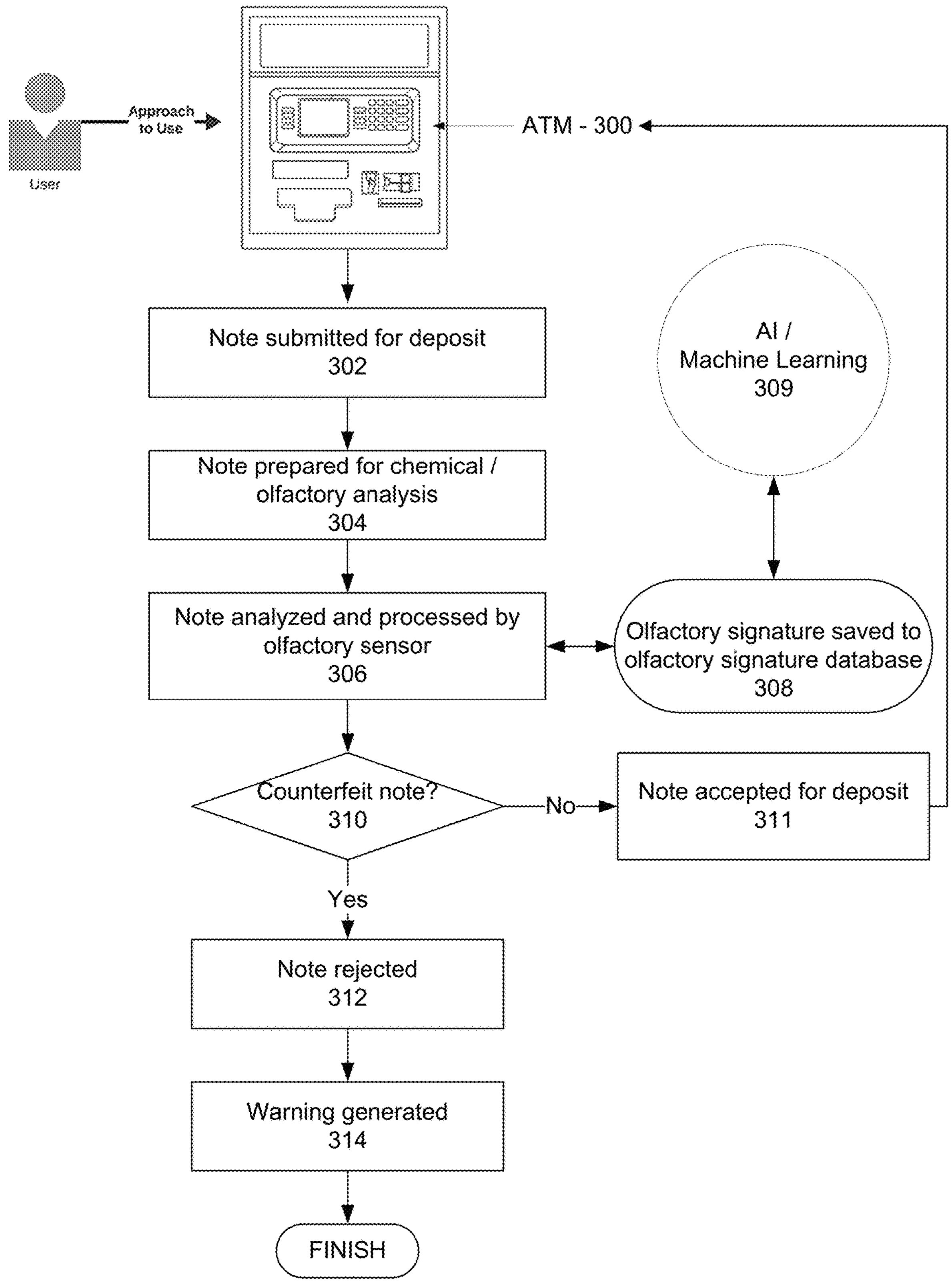
FIG. 3 depicts a sample exemplary functional, flow diagram showing sample interactions, interfaces, steps, functions, and components for system of detecting counterfeit notes in accordance with one or more aspects of this disclosure.

By way of non-limiting example, FIG. 3 depicts an exemplary functional, flow diagram showing sample interactions, interfaces, steps, functions, and components for a system and method of detecting counterfeit notes in accordance with one or more aspects of this disclosure.

A user approaches ATM 300 and inserts a card into the ATM card slot. At 302, the user uploads a note or a series of notes for deposit in the ATM. As previously discussed, at step 300, visual input from the ATM surveillance device (e.g., a camera) may be screened and recorded by security screen. In some examples, the video information about people who are present and/or near the ATM may be used for pattern analysis. In other examples, visual input from the ATM surveillance device may be collected and stored upon detection of a counterfeit note.

At 304, the note may be prepared for chemical or olfactory analysis. A note validator (not shown) may be configured with additional sensors capable of visually or IR scanning the note to identify characteristics such as microprinting, paper type, ink type, metal components, IR detectable components, UV detectable components, particular fonts, geographical characteristics, serial numbers, etc. Inorganic or organic compounds or solvents may be applied to the notes via roller, sprayer, or other techniques known in the art to prepare the note for chemical or olfactory analysis via machine olfaction using at least one olfactory sensor. The ATM may include an internal reservoir to contain the compound or solvent. In other examples, a particular compound or solvent may be applied to a valid note to assist in future olfactory signature analysis.

At 306, and In real-time, the olfactory sensor detects and processes the olfactory signature of the note and the system verifies whether or not the note is a counterfeit and/or a valid note. Olfactory signature detection and the related measurements of the different compositions and/or signatures may include data related to the individual types of materials forming the olfactory signatures. In other examples, the olfactory sensor and related system may be used to detect olfactory signatures which may then be compared to reference olfactory signatures of valid note signatures provided by the US Secret Service and/or compared to reference olfactory signatures of known counterfeit notes.

At 308, the olfactory signature is saved to the olfactory signature database. In some examples, the detected olfactory signature of the note may be saved as a valid signature, a counterfeit signature, or unknown. In some examples, the unknown olfactory signatures may require further processing by financial institution managers, or the unknown signature may be provided to authorities for further processing.

At 309, detected and saved note characteristics and/or olfactory signatures described above may be used in further analysis, machine learning, and/or with AI to create composites of known olfactory signatures—for both valid and counterfeit notes—and variations for use in analyzing uploaded notes, as well as to make recommended changes to the rejection or acceptance parameters of the uploaded notes. In some examples, the captured data described above may be used for pattern analysis to assist in the detection and recognition of counterfeit notes and/or valid notes. In one example and as previously described, pattern analysis and recognition may be based upon a geographic factor such as note origination location and/or ATM upload location. Geographic pattern analysis may provide law enforcement with additional information to target specific locations for monitoring of illegal and fraudulent activity. Pattern analysis may also be used as a factor or characteristic added to a collected olfactory signature and may be used to verify and confirm a detected counterfeit note.

At 310, the system or apparatus determines whether a note is counterfeit and/or whether a note is valid. In some examples, the system or apparatus may be unable to accurately determine if a note is a counterfeit or valid. As such, the system or apparatus may categorize the note as unknown as previously described.

At 311, a non-counterfeit or valid note is accepted for deposit.

At 312, the note is rejected as counterfeit. The note may be withheld and/or removed from circulation. In certain examples, if the note was categorized as unknown, the system and apparatus may be configured to reject the note as valid and the unknown note may be captured for further analysis by the authorities or financial institution. In other examples, the unknown note is simply rejected and returned to the user.

At 314, an automatic alarm system may be triggered and/or a warning may be generated that automatically sends warning signals to nearby authorities or operators, or financial institutions for further action and/or automatic local or remote shutdown of the ATM or network access. In some examples, a note categorized as unknown may also generate a warning to notify the appropriate authorities of the related financial institution or appropriate authorities. The olfactory signature of unknown notes may also be saves to the olfactory signature database for further analysis and pattern recognition as previously discussed.

Skilled artisans will recognize that any number of additional process flows and/or combinations of the same may be implemented consistent with the various arrangements described throughout this application. Hence further flow diagrams would be superfluous to the written descriptions and explanations already provided.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An automated teller machine (ATM) comprising:
a card reader;
a display screen;
a note reader;
an olfactory sensor coupled to the note reader, wherein the olfactory sensor is configured to detect a paper type, a metal type, and an ink type of counterfeit notes; and
a second sensor coupled to the note reader and configured to detect counterfeit notes via visual or IR scanning to identify microprinting, paper type, ink type, metal components, IR detectable components, UV detectable components, fonts, geographical characteristics, and serial numbers, wherein the note reader rejects detected counterfeit notes, and wherein the ATM transmits a warning of detected counterfeit notes to the United States Secret Service and a financial institution of a user of the ATM.

2. The ATM of claim 1, wherein the olfactory sensor is further configured to detect valid notes.

3. The ATM of claim 1, wherein the olfactory sensor is configured to detect a chemical olfactory signature of a counterfeit note, wherein the chemical olfactory signature of the counterfeit note comprises the paper type of the counterfeit note, the ink type of the counterfeit note, and metal components of the counterfeit note.

4. The ATM of claim 3, wherein the chemical olfactory signature comprises a unique odor.

5. The ATM of claim 1, wherein the note reader accepts a detected valid note.

6. The ATM of claim 1, further comprising an internal reservoir containing a compound or a solvent for application to a note to assist in olfactory analysis of the note.

7. A system for detecting counterfeit money comprising:
an automated teller machine (ATM) comprising an olfactory sensor configured to detect counterfeit notes and valid notes; and
an olfactory signature database comprising counterfeit note olfactory signatures and valid note olfactory signatures, wherein the ATM is in communication with the olfactory signature database, wherein the olfactory sensor detects and transmits olfactory note signatures of notes deposited into the ATM to the olfactory signature database, and wherein the olfactory note signatures comprise a note paper type, a note ink type, and a note metal type, and wherein the ATM further comprises an internal reservoir containing a compound or a solvent for application to a note to assist in detection of olfactory note signatures of notes deposited into the ATM.

8. The system of claim 7, wherein the olfactory signature database comprises olfactory signatures of counterfeit notes.

9. The system of claim 7, wherein the ATM is configured to reject a detected counterfeit note for deposit.

10. The system of claim 9, wherein the ATM is further configured to remove a detected counterfeit note from circulation and transmits a warning of detected counterfeit notes to the United States Secret Service and a financial institution of a user of the ATM.

11. A method of detecting counterfeit money, comprising:
accepting, via an automated teller machine (ATM), a note for deposit, wherein the ATM comprises an olfactory sensor configured to detect counterfeit notes and a second sensor configured to detect counterfeit notes via visual or IR scanning to identify microprinting, paper type, ink type, metal components, IR detectable components, UV detectable components, fonts, geographical characteristics, and serial numbers;
detecting, via the olfactory sensor and the second sensor, a counterfeit note;
rejecting the counterfeit note; and
transmitting a warning of the detected counterfeit note to a financial institution of a user of the ATM.

12. The method of claim 11, further comprising:
conducting a pattern analysis upon detection of the counterfeit note, wherein the pattern analysis comprises an olfactory signature, a chemical signature, a geographic location of the ATM, or a geographic origination of the detected counterfeit note; and
verifying, via the pattern analysis, the detected counterfeit note is counterfeit.

13. The method of claim 11, wherein the ATM further comprises an internal reservoir containing a compound or a solvent for application to the note to assist in detecting, via the olfactory sensor, a counterfeit note.

* * * * *